(Model.)
R. I. KNAPP.
SIDE HILL PLOW.
No. 265,328. Patented Oct. 3, 1882.
Fig. 1.
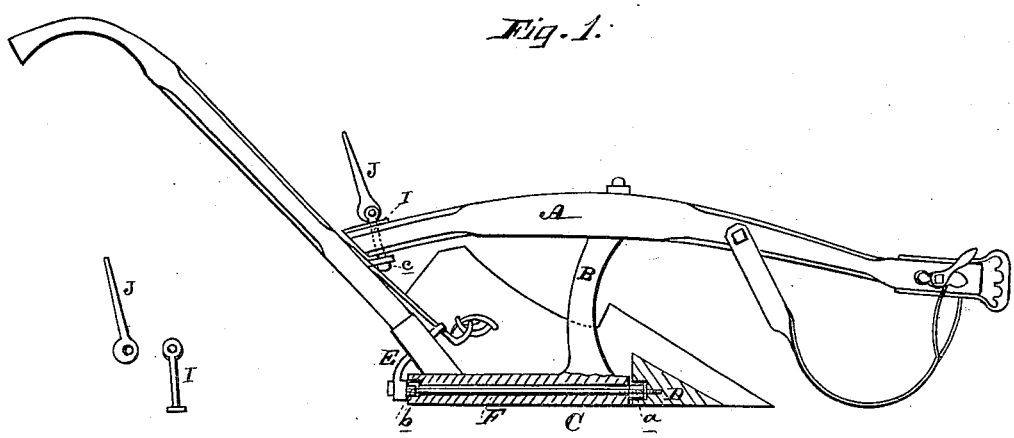
Fig. 2.
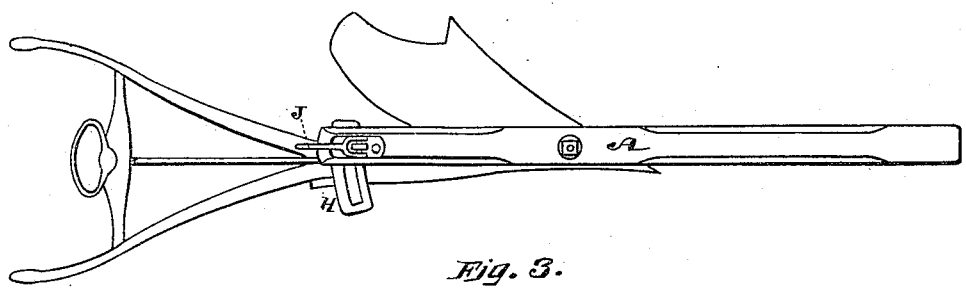
Fig. 3.
Fig. 4.
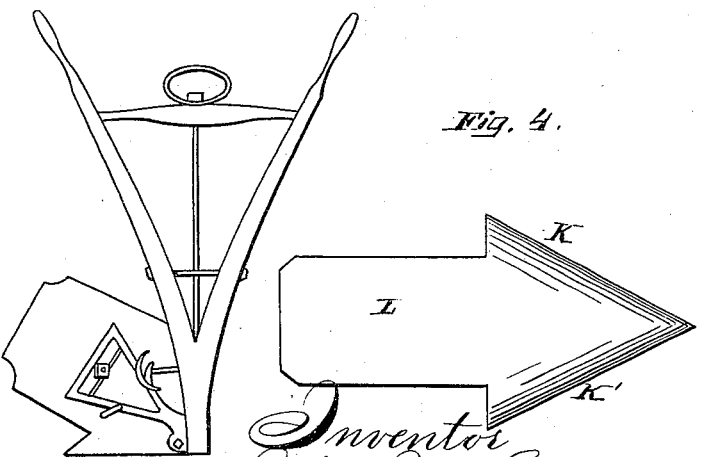
Witnesses
Geo. H. Strong
Frank H. Brooks
Inventor
Robert I. Knapp
By Dewey & Co. Attys
N. PETERS. Photo-Lithographer. Washington, D. C.

UNITED STATES PATENT OFFICE.

ROBERT I. KNAPP, OF HALFMOON BAY, CALIFORNIA.

SIDE-HILL PLOW.

SPECIFICATION forming part of Letters Patent No. 265,328, dated October 3, 1882, Application filed November 29, 1881. (Model.)

*To all whom it may concern:*

Be it known that I, ROBERT I. KNAPP, of Halfmoon Bay, county of San Mateo, State of California, have invented an Improved Side-Hill Plow; and I hereby declare the following to be a full, clear, and exact description thereof.

My invention relates to certain improvements in side-hill or reversible plows, and it is more especially applicable to a plow for which Letters Patent were issued to me on the 7th day of September, A. D. 1875, No. 167,402.

My present invention relates to an improved means of securing and swiveling the share to the frame, and a means of swiveling and locking the beam, so as to throw the plow to or from the land.

It also relates to an improvement in the form of the share to its right or left position, as will be more fully explained by reference to the accompanying drawings, in which—

Figure 1 is a side elevation of the plow. Fig. 2 is a top view. Fig. 3 is a rear view. Fig. 4 is a view of the share and mold-board.

In my former patent the share was secured to the frame by an independent rod or bolt, which extended across at a point where it was liable to become clogged by dirt.

In my present invention, A is the plow-beam, which is supported upon the standard B. C is the landside, and it has a cylindrical stud, a, projecting from its front end, and this stud enters a corresponding hole in the thickened lump or nose-piece D, on the under side of the plow-point. The rear end of the landside has a depression to receive a stud, b, which projects from the lower end of the brace E. The upper end of the brace is secured to the mold-board by a bolt, as shown, and the share will thus turn around the studs as a center. A long bolt, F, passes through the two studs a and b through the whole length of the landside, and it has screw-threads cut upon its ends, so that it may be inserted and screwed into the nose-piece D, and thus hold the whole firmly together without presenting any surface to clog.

This plow is especially valuable for use in vineyards, where it is employed to throw the earth upon each side of the rows, and in order to throw the plow to or from the land the beam is fitted to turn upon the top of the standard B. A slotted plate or rest, H, lies horizontally beneath its rear end, being secured to the front part of the handles so as to support it. A bolt, I, passes through the end of the beam and the slot, and it has a nut, c, which may be drawn up against the bottom of the plate or rest H. This nut is used in preference to a fixed head, because it can be adjusted upon the bolt, so that if the cam becomes loose and fails to lock, the nut may be set up and the adjustment thus made. A cam-lever, J, is pivoted to the top of the bolt, and when it is turned to loosen the bolt the end of the beam may be turned from side to side. By simply moving the cam-lever in the opposite direction the beam is rigidly locked in place, without the use of screws or nuts needing wrenches to adjust.

The share in my plow is made concave toward the point, each side K K' turning up equally in order to adapt it to its two positions upon opposite sides of the beam and give it equal facility to turn the soil to the right or to the left; but the upper rear portion, L, of the mold-board, instead of being continued concave, is gradually flattened out until it presents a nearly or quite plane surface, so that the action will be to turn the soil over with equal facility whether the share is at the right or left of the beam. The concavity of the mold-board is continuous with that of the share in the direction of its length; but in its transverse dimensions the concavity extends from the shank into the mold-board L, constantly lessening in degree until it nearly or quite disappears at about the center of the length of the mold-board, so that the rear portion is plane or flat in its transverse diameter.

I am aware that heretofore side-hill plows have been made with the landside perforated longitudinally to receive a bolt, on which it turns, and having a share pivoted longitudinally to the beam. Hence I make no broad claim to these features.

Having thus described my invention, what I claim as new, and desire to secure by Letters Patent, is—

1. In a reversible mold-board plow, the landside C, having the stud a, entering an opening in the part D, and the socket to receive the stud b, projecting from the brace E, in combination with the bolt F, extending through the landside and studs and screwing into nose-piece D, substantially as and for the purpose herein described.

2. In combination with a reversible mold-board plow, the beam A, swiveling upon the standard B, the horizontal slotted plate H, secured to the handles below the rear end of the beam, the bolt I, extending through the beam and the slot in the plate, and the locking cam-lever J, the whole combined to operate substantially as herein described.

3. In a plow, the beam A, swiveling upon the standard and having its rear end moving from side to side upon the rest-plate H, in combination with the bolt I and cam-lever J, as shown, the bolt I having the adjustable nut c, substantially as and for the purpose herein described.

4. In a reversible mold-board plow having the share made concave, with the edges K K′ turned up, as shown, the mold-board L, the rear portion of which is made plane or flat in its transverse diameter, substantially as herein described.

5. In a reversible mold-board plow, the combination of a share made concave upon its working-face both longitudinally and transversely, and the mold-board L, made concave longitudinally in continuation with the share, but having its rear portion plane or flat in its transverse diameter, substantially as herein described.

In witness whereof I have hereunto set my hand.

R. I. KNAPP.

Witnesses:
FRANK A. BROOKS,
S. H. NOURSE.